June 3, 1941.  J. J. MIRATSKY  2,244,498
OPTICAL COLOR SEPARATION MEANS
Filed March 18, 1939  2 Sheets-Sheet 1
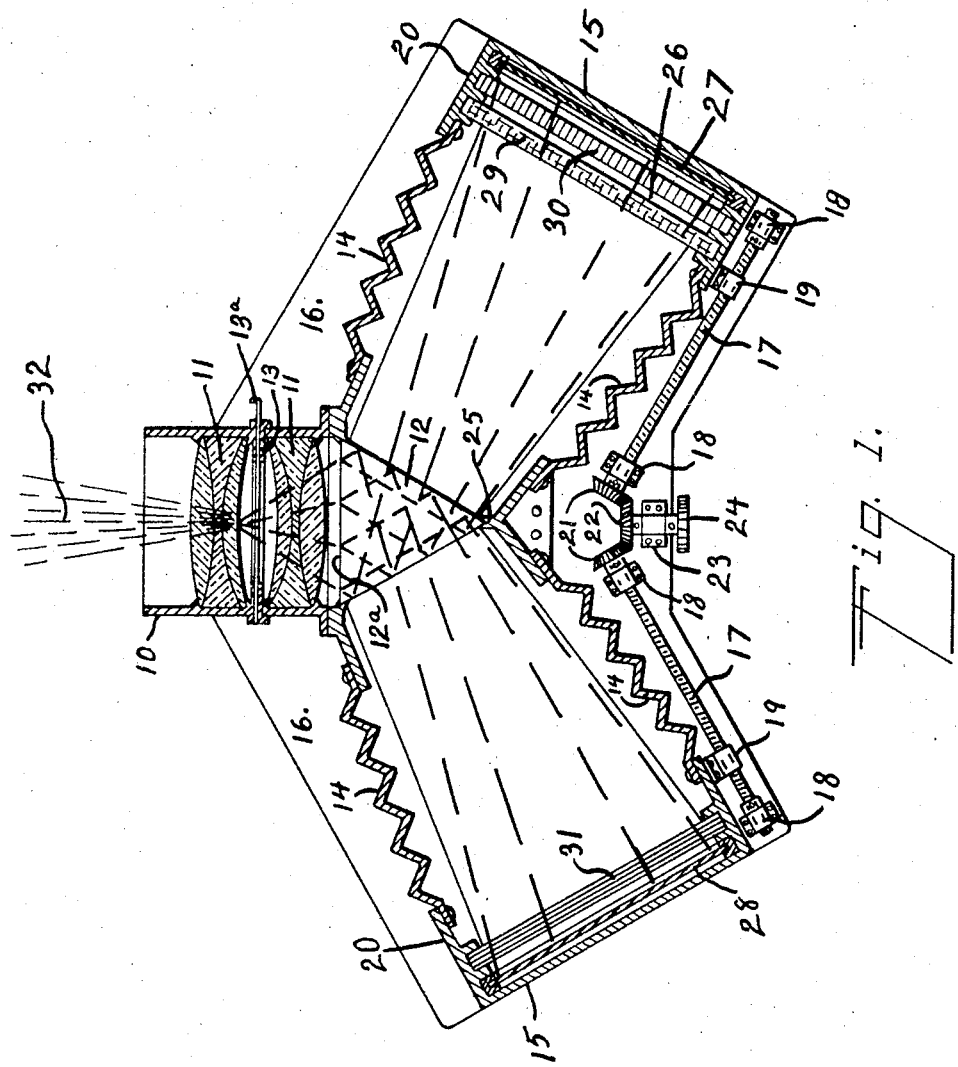
INVENTOR.
JAMES J. MIRATSKY.
BY John C. Baisch
ATTORNEY.

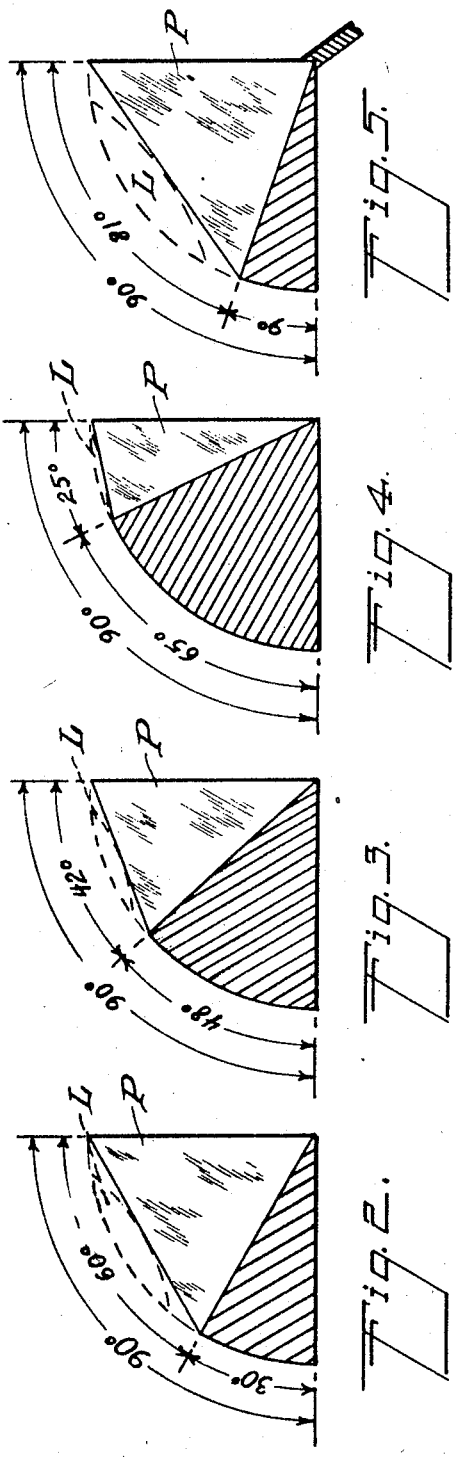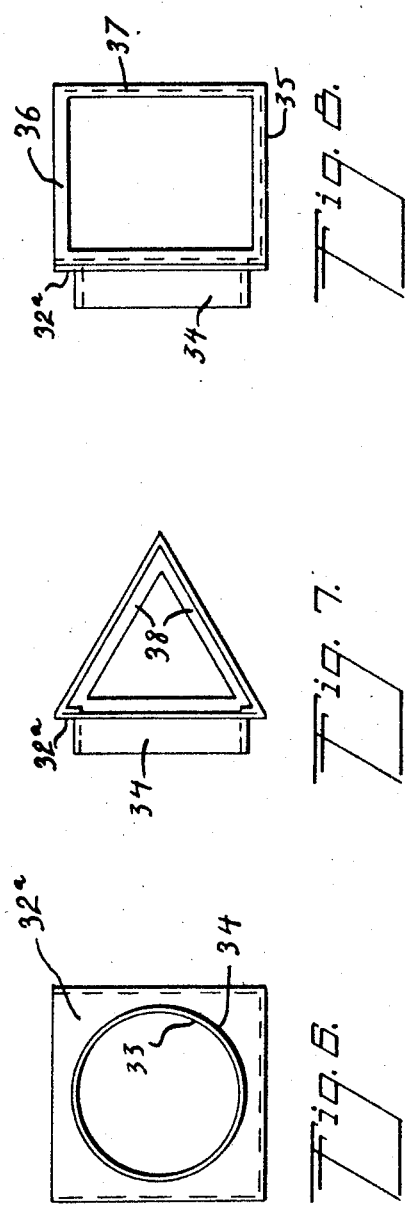

Patented June 3, 1941

2,244,498

UNITED STATES PATENT OFFICE 2,244,498

OPTICAL COLOR SEPARATION MEANS

James J. Miratsky, Omaha, Nebr.

Application March 18, 1939, Serial No. 262,613

2 Claims. (Cl. 95—2)

This invention relates generally to color separating systems and particularly to optical color separating means for cameras, projection machines and the like in connection with the three color system of making negatives, prints, and the like.

To my knowledge, present methods employ semi-reflecting mirrors which reflect a portion of the light entering the cameras and permit the remainder to pass on through. This is not satisfactory for various reasons generally known in the arts. Pellicle mirrors, which are generally used, are more or less subject to physical damage or climatic changes. Glass mirrors are subject to secondary reflections, and registration is affected causing color fringe on finals.

It is therefore an important object of my invention to provide optical means for separation of color images in three color photography and the like.

It is another object of my invention to provide a device of this character that will affect clear images on all plates or films in a three color process camera.

Another object of the invention is to provide means of this character free from secondary reflections and color fringes.

Another object of the invention is to provide a system of this character using a prism of suitable size and shape that will reflect two images necessary in making three, colored plates or films.

A further object of the invention is to provide means in a camera or projection machine adapted to prevent reflection of light from one side to the other.

A further object of the invention is to provide means of this character that is not easily damaged and will not readily get out of order.

Numerous other objects and advantages of the invention will be apparent as it is better understood from the following detailed description, which, taken in connection with the accompanying drawings discloses a preferred embodiment thereof.

Referring to the drawings:

Figure 1 is a diagrammatical view of a camera embodying my invention.

Figure 2 is a diagrammatical view of an equilateral prism and lens for same.

Figure 3 is a diagrammatical view of a prism of 42° with a suitable lens therefore.

Figure 4 is a diagrammatical view of the prism of 25° with its lens.

Figure 5 is a diagrammatical view of a prism of 81° together with its lens.

Figure 6 is a front end view of a prism frame.

Figure 7 is a plan view of same.

Figure 8 is a side elevation of same.

I contemplate using in connection with my invention, standard types of films or plates customarily employed in making the yellow, magenta or red, and blue negatives of the three colored process of photography.

Referring more particularly to Figure 1, reference numeral 10 indicates a lens mount having lens elements 11 operably received therein, said mount including a diaphragm 13 and a shutter 13a. A prism 12 is disposed adjacent the inner side of the lens 11 and it should be noted that the prism should not come into physical contact with the lens. A camera bellows 14 extends outwardly of each free side of prism 12 with backs 15 thereof substantially parallel spaced relation with the respective adjacent sides. The bellows are mounted on a camera base or frame 16. The backs 15 are adapted to be adjusted toward and away from the prism and synchronize with each other. The following described mechanism is employed to effect this adjustment; screws 17 are rotatably secured in brackets 18 adjacent each end thereof, said brackets being fixed to the base 16 by any suitable means. Each screw is provided with a nut 19 fixed to respective end members 20. A bevel gear 21 is secured to each of the adjacent ends of the screws and said gears 21 are operated by a gear 22 meshed therewith, said gear 22 being fixed to a shaft rotatably received in a bracket 23 secured to base 16. The knurled knob 24 is fixed to the opposite end of the shaft on which gear 22 is secured, and rotation of said knob affects simultaneous adjustment of the members 20 toward and away from the prism. A baffle 25 extends longitudinally of the prism at the apex thereof. The baffle prevents hazy reflections of the prism which might otherwise occur due to the fact that such prisms can not be ground to a sharp point at their angles. Films or plates 26, 27, and 28 are removably disposed in the respective members 20 which also are adapted to operably receive color filters 29, 30, and 31 respectively. Filter 31 is a red filter and records a blue printer. Filter 29 is a blue filter and records a yellow printer. Filter 30 is a green filter and records a red printer. In practice, films 26 and 27 are arranged with their emulsional sides together in one frame member 20 and film on plate 28 in the other frame member 20. The plane of the emulsion side of film 28 must be substantially the same distance from the respective face of the prism as the plane of the emulsion sides of films 26 and 27, and the planes of the emulsion sides of the respective films or plates should be parallel with the respective free adjacent sides of the prism. This is necessary to effect accurate registration of the respective films. Light rays 32 enter the camera through the lens and are projected into the prism 12. Images are reflected in the prism and projected from each of the free sides thereof onto the respective plates in the members 20 being reflected from the opposite side. The baffle 25 prevents any reflection of light from either side of the camera about the apex of the prism. The front side 12a of the prism can not be of less width than the aperture of the lens and the width of said side must be sufficient to receive the full aperture of the lens. Figures 2 to 5 inclusive show various types of prisms that may be used but it is to be understood that other variations may also be used. Figures 2 to 5 represent various angles of views of various lenses. In said Figures 2 to 5 inclusive dotted lines L indicate the camera lens in the respective figures and P indicates the prisms thereof. The shaded portions in said figures represent the angle of field in degrees, at full aperture of various focal lengths of the respective lenses, and such angle is a variable factor subject to the lenses of respective manufacturers. The prism has an operating angle of less than 90° and the angle of the field in degrees deducted from 90° establishes the prism angle for the respective lens used. It is to be understood that variations of the angle of the prism will effect substantially the same results when the prism is taken in connection with the proper lens. It is necessary, however, to co-ordinate the prism and the lens with reference to the focal length of the lens; and it is believed to be preferable to use a standard prism although a prism of suitable plastic material or optical flat glass filled with a liquid having the same refraction as glass may be used.

One type of frame in which a prism may be mounted is illustrated in Figures 6 to 8 inclusive. The front side or fore of the frame is indicated by reference numeral 32a and has an opening 33 therein. A flange 34 is provided about opening 33 and extends forwardly or outwardly of the front member 32 of the frame, said flange being adapted to be received in a lens frame for attachment of the prism thereto. Extending triangularly, rearwardly of the front member 32 are frame members 35, said members 35 being angle pieces. Frame members 36 are disposed rearwardly of the top of member 32 and are connected with members 35 by angular portion 37. The prism is adapted to be inserted in the frame from the top thereof and to rest on inturned portions 38 of the lower frame member 35. Compensators or filters may be disposed adjacent the respective reflecting sides of the prism 12 to permit use of the camera in daylight, floodlight, Mazda, or arcs. Compensators for different makes of emulsions can also be used adjacent the respective sides of the prism. While the filters are shown in Figure 1 as being disposed adjacent the plates or films, filters may also be used adjacent the respective sides of the prism.

The lens and prism are preferably arranged as a unit which may be raised or lowered as the particular problem of photography may require while the emulsion carriers remain vertical, resulting in distortion free photography.

Where necessary plates with proper filters incorporated in the emulsions may be used particularly where two plates are placed with their emulsion sides together. Here the projection from one side of the prism is subdivided into two images, one on each of the respective plates. It should be noted that my invention can be used either in connection with the camera or the process can be reversed into a projection creating images for color separation can be supplied to a camera and also projection duplicates and can be used either for moving pictures or stills.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

Having thus described my invention, what I claim is:

1. In a device of the class described, the combination of a camera having a lens with a prism adjacent the rear side of the lens in spaced relation therewith and adapted to receive an image projected by the lens on the front side thereof, the width of said front side of the prism being greater than the aperture of the lens, divergent bellows operably connected with the lens and prism, suitable negatives adjacent the open ends of the respective bellows, the planes of the emulsion sides of the respective negatives being substantially parallel with the respective adjacent faces of the prism and the distance of said negatives from the respective faces of the prism being the same, baffle means along the apex of the prism adapted to prevent reflection of light from one side to the other, and means for synchronously adjusting the respective bellows relative to the distance of the negatives from the prism.

2. In a device of the class described, the combination of a camera having a lens with a prism adjacent the rear side of the lens in spaced relation therewith and adapted to receive an image projected by the lens on the front side thereof, the width of said front side of the prism being greater than the aperture of the lens, divergent bellows operably connected with the lens and prism, suitable negatives adjacent the open ends of the respective bellows, the planes of the emulsion sides of the respective negatives being substantially parallel with the respective adjacent faces of the prism and the distance of said negatives from the respective faces of the prism being the same, and baffle means along the apex of the prism adapted to prevent reflection of light from one side to the other.

JAMES J. MIRATSKY.